United States Patent [19]
Ramsier et al.

[11] Patent Number: 5,844,400
[45] Date of Patent: Dec. 1, 1998

[54] BATTERY DISCRIMINATING SYSTEM FOR CHARGING A BATTERY OF A MOBILE TERMINAL

[75] Inventors: Dean A. Ramsier, Rittman; Lee E. Leppo, Tallmadge; Timothy J. Manns, Seven Hills; Clifford P. Brake, Wadsworth, all of Ohio

[73] Assignee: Telxon Corporation, Akron, Ohio

[21] Appl. No.: 802,761

[22] Filed: Feb. 20, 1997

[51] Int. Cl.[6] .................................................. H01M 10/46
[52] U.S. Cl. ............................................................ 320/106
[58] Field of Search .............................. 320/5, 6, 15, 20, 320/21, 30, 39, 48, 106, 107, 112

[56] References Cited

U.S. PATENT DOCUMENTS

| | | | |
|---|---|---|---|
| 5,049,804 | 9/1991 | Hutchings | 320/39 X |
| 5,111,128 | 5/1992 | Branan, Jr. et al. | 320/106 |
| 5,172,043 | 12/1992 | Toops | 320/106 |
| 5,237,257 | 8/1993 | Johnson et al. | 320/15 X |
| 5,371,453 | 12/1994 | Fernandez | 320/5 |
| 5,420,493 | 5/1995 | Hargadon et al. | 320/15 |
| 5,510,690 | 4/1996 | Tanaka et al. | 320/2 |
| 5,523,668 | 6/1996 | Feldstein | 320/6 |
| 5,602,454 | 2/1997 | Arakawa et al. | 320/106 |
| 5,606,238 | 2/1997 | Spellman et al. | 320/110 |
| 5,661,392 | 8/1997 | Imazeki | 320/106 |

*Primary Examiner*—Edward Tso
*Attorney, Agent, or Firm*—Renner, Otto, Boisselle & Sklar, P.L.L.

[57] ABSTRACT

The present invention relates to a battery discrimination system which provides for charging a battery of a mobile terminal where the battery may be any one of a plurality of types of batteries each having different charge characteristics. The system includes a mobile terminal, the mobile terminal including a battery pack housing for storing at least one of a plurality of batteries. The plurality of batteries including batteries of a first battery type and batteries of a second battery type, the batteries of the first battery type having charge characteristics different from the batteries of the second battery type. The system further includes a docking cradle for receiving and storing the mobile terminal. The cradle includes a battery charger for charging the at least one of a plurality of batteries. The battery charger includes a battery discriminator for identifying whether the at least one of a plurality of batteries is of the first battery type or of the second battery type, wherein the battery charger charges the one of a plurality of batteries in accordance with the identification of the battery type determined by the battery discriminator.

27 Claims, 6 Drawing Sheets

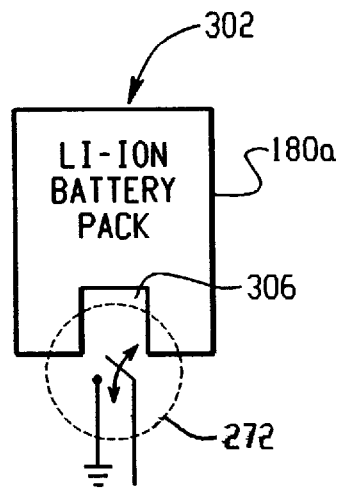
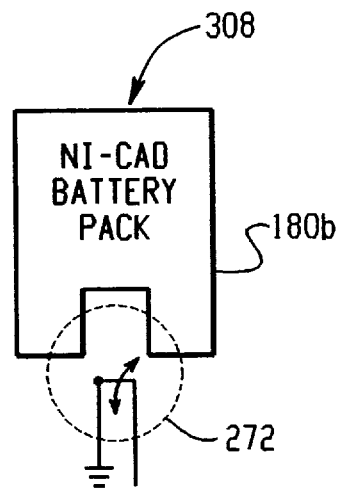
Fig. 6A    Fig. 6B
| MOBILE TERMINAL | BATTERY TYPE | CRADLE SIDE VOLTAGE GOING TO A/D |
|---|---|---|
| NOT IN CRADLE | — | 5 VOLTS |
| IN CRADLE "OFF" | LI-ION | 4.3 - 4.7 VOLTS |
| IN CRADLE "ON" | LI-ION | 2.9 - 3.3 VOLTS |
| IN CRADLE "OFF" | NI-Cd | 2.25 - 2.6 VOLTS |
| IN CRADLE "ON" | NI-Cd | 1.8 - 2.1 VOLTS |
Fig. 7

BATTERY DISCRIMINATING SYSTEM FOR CHARGING A BATTERY OF A MOBILE TERMINAL

TECHNICAL FIELD

The present invention relates to a battery discrimination system, device and method for mobile units.

BACKGROUND OF THE INVENTION

In recent years, the use of wireless mobile terminals has become increasingly popular to help automate and expedite processes in retail, manufacturing, warehousing and other industries. For instance, in a retail environment the wireless mobile terminal may take the form of a wireless bar code reading device for use in tracking inventory and checking prices. In the warehousing industry, the same device may be used to keep accurate accounts of incoming and outgoing shipments. In the healthcare, transportation and other industries, the mobile terminal may take the form of a wireless pen based computer to aid in on-site document control procedures. The mobile terminals may operate independently by storing all information until later downloaded or may include a radio which allows it to communicate in real time to a host computer connected to a LAN, for example.

In order to allow for wireless operations of each mobile terminal, an independent power source or battery is provided within each. The batteries will typically provide the mobile terminal with several hours of operation before needing recharging. Once a battery is drained, however, it must be connected to a recharging unit in order to re-obtain its full power capacity. Recharging units or stations which are typically configured to hold a mobile terminal are known as a cradle. Cradles today come in varying degrees of sophistication. A basic function of many cradles is to provide some sort of interface with the mobile terminal through which information stored in the mobile terminal can be downloaded to a central computer or other device. Another main purpose of a basic cradle is to supply recharging power to a battery pack attached to the mobile terminal so that the batteries can be fully recharged. As battery packs can be composed of a variety of different battery types, the cradle must be pre-set to supply recharge current at a level appropriate for the battery type expected. Typical battery types used today include Nickel-Cadmium (Ni—Cd), Lithium-Ion (Li—Ion), Nickel-Metal-Hydride (Ni—MH), etc. The benefit of using one type of battery over the other varies with the application at hand. For example, Ni—Cd cells are preferred in applications requiring relatively high discharge rates. Chargers are presently available to charge Ni—Cd batteries, however, Ni—Cd batteries are toxic and their use is being restricted by law. Ni—MH are often selected where capacity per unit weight or volume, rather than peak power or safety disposal are critical. These cells can also be charged by presently available battery chargers. Li—Ion batteries generally have a capacity equivalent to at least an Ni—MH batteries, but have significant reduction in weight.

Although electronic devices such as portable terminals can use different types of batteries (i.e., Ni—Cd, Ni—MH, Li—Ion, etc.) these batteries have charge characteristics greatly different from each other. Thus, one battery charger (i.e., a cradle) generally cannot charge more than one type of battery. Furthermore, if one of the batteries is charged according to the charge conditions for another type battery, the battery may be damaged or even explode, and could cause damage to the portable terminal.

Therefore, what is needed is a method and apparatus for allowing mobile terminals which use interchangeable battery types to be charged by a single cradle which can sense the battery type and charge the battery according to its specific charging characteristics.

SUMMARY OF THE INVENTION

The present invention relates to a battery discrimination system which provides for charging a battery of a mobile unit where the battery may be any one of a plurality of types of batteries each having different charge characteristics. The battery discrimination system is particularly useful in that is can be easily applied to existing mobile units to provide for universal charging of mobile units that may use batteries from among a plurality of types having different charge characteristics. Hence, the present invention affords for increased versatility in the use of various types of batteries in a mobile unit since one battery charger may be employed to charge the various types of batteries that may be used, respectively, by the mobile unit.

More particularly, the present invention introduces a mobile terminal circuit which provides for varying degrees of voltage levels in accordance with the type of battery currently being used by the mobile terminal and the status (i.e., docked, undocked, on or off) of the mobile terminal. The voltage levels are varied on an output status line going to a cradle receiving the mobile terminal. Based on the degree of voltage level on the status line, the cradle can determine the type of battery (e.g., Li—Ion, Ni—Cd, etc.) in the PTC as well as the status of the mobile terminal. The cradle can then deliver an appropriate amount of power to the mobile terminal so that it may operate and also charge the battery in accordance with the particular charging characteristics of that battery.

In accordance with one particular aspect of the invention, a battery charging system is provided, including: a mobile terminal, the mobile terminal including a battery pack housing for storing at least one of a plurality of batteries; the plurality of batteries including batteries of a first battery type and batteries of a second battery type, the batteries of the first battery type having charge characteristics different from the batteries of the second battery type; and a docking cradle for receiving and storing the mobile terminal, the cradle including a battery charger for charging the at least one of a plurality of batteries, the battery charger including a battery discriminator for identifying whether the at least one of a plurality of batteries is of the first battery type or of the second battery type, wherein the battery charger charges the one of a plurality of batteries in accordance with the identification of the battery type determined by the battery discriminator.

According to another aspect of the invention, a docking cradle for a mobile terminal is provided, including: a housing, the housing being adapted to receive and store the mobile terminal; a battery charger for charging at least one battery of the mobile terminal; and a battery discriminator for discriminating whether the at least one battery is of a first battery type or of a second battery type, the first battery type having charge characteristics different from the second battery type; wherein the battery charger charges the at least one battery in accordance with the battery type of the at least one battery determined by the battery discriminator.

In accordance with still another aspect of the invention, a method for charging a mobile terminal is provided, including the steps of: coupling the mobile terminal to a battery charger, the battery charger being adapted to charge at least one battery of the mobile terminal, the at least one battery being any one of a plurality of battery types having different charge characteristics, the at least one battery being housed in a battery pack, the battery pack being any one of a plurality of types of battery packs corresponding to the plurality of battery types; using the battery charger to discriminate the type of the at least one battery from the plurality of battery types, wherein the battery charger discriminates the type of the at least one battery based on a signal received from the mobile terminal, the signal being representative of the type of the at least one battery; and charging the at least one battery according to the thus determined type of the at least one battery.

According to yet another aspect of the invention, a method of determining a charge current to supply a mobile terminal is provided, including the steps of: receiving the mobile terminal by a cradle, the mobile terminal including a rechargeable battery; providing a signal on a status contact associated with the mobile terminal indicative of a type of rechargeable battery included in the mobile terminal; sensing the signal on the status contact of the mobile terminal with a battery discriminator of the cradle; and providing from the cradle an appropriate charge current to the rechargeable battery based on the signal sensed on the status contact.

In accordance with another aspect of the invention, a mobile terminal is provided, including: a housing shaped to be received by a cradle; a rechargeable battery; battery charging status circuitry disposed in the housing and interfacing with the rechargeable battery; the status circuitry providing an output signal to be sensed by circuitry associated with the docking cradle when the mobile terminal is received in the docking cradle, the output signal being of a first signal level if the rechargeable battery is of a first battery type and a second signal level if the rechargeable battery is of a second battery type.

To the accomplishment of the foregoing and related ends, the invention, then, comprises the features hereinafter described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 6A is a schematic diagram of a Li—Ion battery pack in accordance with the present invention;

FIG. 6B is a schematic diagram of a Ni—Cd battery pack in accordance with the present invention;

FIG. 7 is a table of voltage levels indicative of the status of the mobile terminal and battery types according to the present invention.

DESCRIPTION OF THE PREFERRED EMBODIMENTS

Figure 1C:
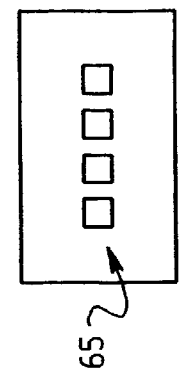
FIG. 1C is a bottom view of the mobile terminal showing the set of connector ports in accordance with the present invention.

The present invention will now be described with reference to the drawings, wherein like reference numerals are used to refer to like elements throughout.

Figure 1B:
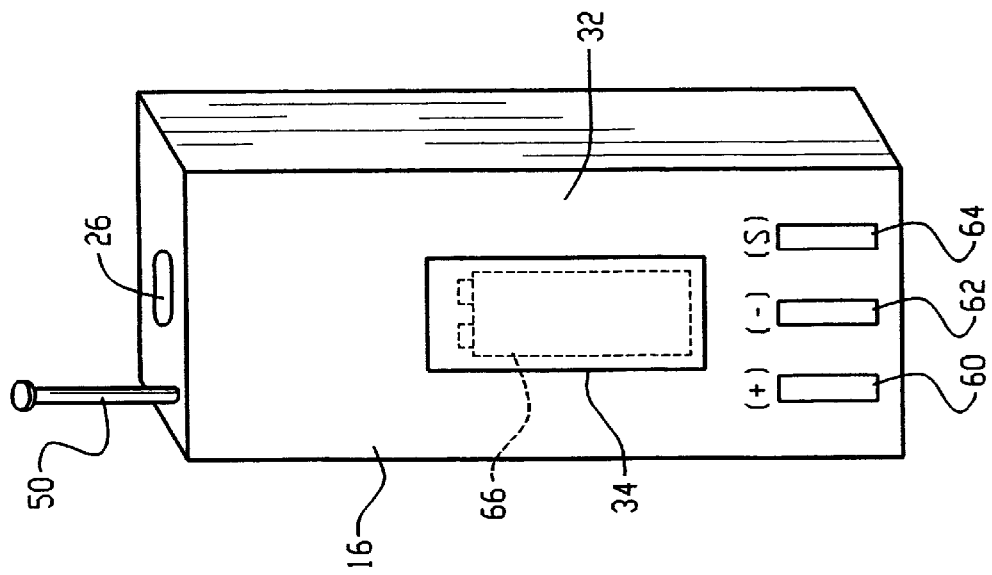
FIG. 1B is a perspective view of the back side of a mobile terminal in accordance with the present invention.
Figure 1A:
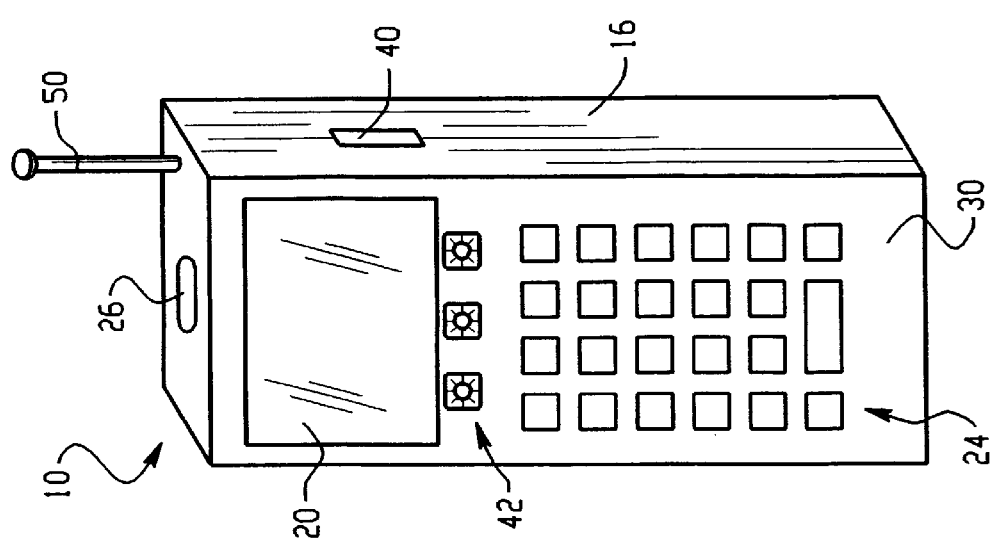
FIG. 1A is a perspective view of the front side of a mobile terminal in accordance with the present invention.

Referring initially to FIGS. 1A and 1B there is shown pictorial representations of front and back views, respectively, of a portable electronic device in accordance with the present invention and is generally designated 10. In the exemplary embodiment, the portable device is a mobile terminal 10 used in a wireless communication network for tracking inventory, storing data, etc. The user may input and/or process data via a keypad, bar code scanner, etc. independent of the mobile terminal 10 being connected to a LAN, for example. When the mobile terminal 10 does not include a radio to provide for real time communications of data to a LAN, the data is stored in memory within the mobile terminal 10. In such circumstances, when the mobile terminal 10 is eventually connected to a LAN, the data can be transmitted to a host computer (not shown). It will be appreciated that the portable device could also be any other device that is portable in nature and having electronic circuitry therein in accordance with the present invention. For example, the portable device could be a laptop computer or notebook computer, a PDA, or even a cellular telephone or pager, which employs rechargeable batteries.

In this particular embodiment, the mobile terminal 10 includes a housing 16, a display 20 for displaying information to a user, a set of user interface keys 24 for allowing the user to input information and/or operational commands and a bar code scanner 26. The described components 20, 24 and 26 are located in the housing 16 which is an elongated enclosure of a size and including such contours as to conveniently fit into the open palm of the user. The housing 16 may be comprised of a number of shell portions such as for example front and rear shells 30 and 32 as well as a battery pack lid 34. The user interface keys 24 may include a full alpha-numeric keypad, function keys, enter keys, etc. The mobile terminal 10 also includes a window through which a bar code reader 26 is able to read a bar code label presented to the mobile terminal 10. Also included in the mobile terminal 10 is an ON/OFF power switch 40 for turning the device on and off. Furthermore, the mobile terminal 10 includes status lights 42 for indicating to the user such things as operation of a memory hard drive, low battery power, low power consumption, etc. The mobile terminal 10 also includes an antenna 50 which allows the mobile terminal 10 to transmit and receive data via an RF link to a network backbone such as a LAN (not shown).

The mobile terminal 10 further includes three electrical contacts 60, 62 and 64 exposed at the back side of the housing 16. Contacts 60 and 62 are employed to provide power from an external source (i.e., a cradle) to the mobile terminal and status contact 64 is used to provide a status signal to the external power source so that the status (i.e., docked, undocked, on or off) of the mobile terminal 10 can be determined. Furthermore, the status signal provided via status contact 64 affords for determining the type of battery being used by the mobile terminal 10 so that the battery can be charged according to its particular charge characteristics. Referring now to FIG. 1C, the mobile terminal 10 also includes a set of four electrical contacts 65. The four electrical contacts 65 are used for communications between the electronic circuitry within the portable terminal 10 and a LAN system backbone (not shown). Preferably, all the contacts 60, 62 and 64 and 65 are made of a highly conductive metal that is resistant to corrosion such as for example Nickel Plated Beryllium Copper.

Turning back to FIGS. 1A and 1B, a battery pack 66 is located on the back side of the mobile terminal 10. The battery pack 66 is dimensioned to receive and hold rechargeable batteries which in series combination provide a total nominal voltage of about 7.2 volts. This voltage corresponds to the preferred supply voltage of the mobile terminal 10. The battery pack 66 is adapted to be easily removable and installable. Accordingly, the user can carry a spare battery pack preloaded with batteries to replace a battery pack with dead batteries. The battery pack 66 is designed to prevent being inserted in the mobile terminal 10 in the wrong direction so as to avoid possible damage to the mobile terminal 10.

Figure 2:
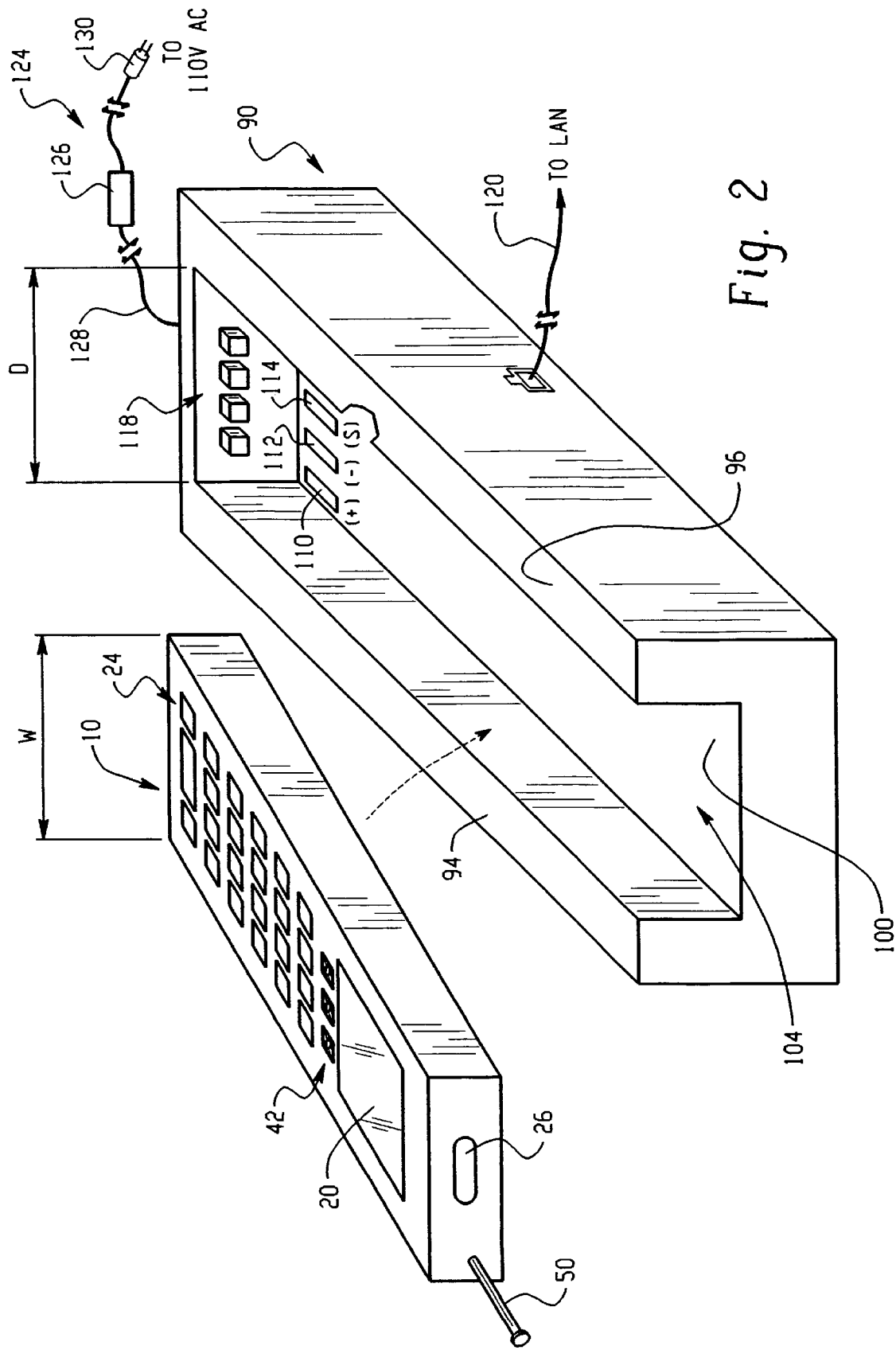
FIG. 2 is a perspective view of a mobile terminal and cradle according to the present invention.

FIG. 2 illustrates a cradle 90 for use in conjunction with the mobile terminal 10. The cradle 90 includes side walls 94 and 96 extending vertically from a base member 100. The side walls 94 and 96 are spaced apart by a distance D which is slightly longer that a width W of the mobile terminal 10. Accordingly, the cradle 90 is adapted to receive and store the mobile terminal 10 as a result of the mobile terminal 10 being turned on its back and slid into recess 104 of the cradle 90.

The base member 100 includes a contacts 110, 112 and 114 designed to correspond to the contacts 60, 62 and 64, respectively, located at the back side of the mobile terminal 10. The cradle 90 determines the status of the mobile terminal 10 and the battery type being used via the status signal received from the mobile terminal 10 via contacts 64 and 114. The cradle 90 supplies power (including battery recharging power) to the mobile terminal 10 via contacts 110, 112 and corresponding contacts 60, 62. The cradle 90 also includes a set of four electrical contacts 118 which correspond to the set of contacts 65 of the mobile terminal 10. The contacts 118 of the cradle are positioned so as to align with the contacts 65 of the mobile terminal 10 when the mobile terminal 10 is received by or "docked" in the cradle 90. The contacts 118 and 65 are used, for example, for communications between the cradle 90 and the mobile terminal 10. Accordingly, when the mobile terminal 10 is docked to the cradle 90, the mobile terminal 10 can connect to the LAN, for example, via the cradle 90. In addition, each of the contacts 60, 62, 64, 65, 110, 112, 114 and 11 8 are preferably spring loaded to urge the contacts into secure physical and electrical contact with the corresponding contacts. The weight of the portable terminal 10 standing on its back helps to further ensure satisfactory contact between the contacts 60, 62, 64 and 110, 112, 114, respectively. It is to be understood that any type of contact suitable for carrying out the present invention could be used without departing from the scope of the invention. Such contacts may be of the type which also provide a mechanical type connection as well as an electrical connection as will be appreciated.

The cradle 90 also includes a LAN connector 120 attached to an exterior of side wall 96. According to the preferred embodiment, the LAN system backbone to which the connector 120 is coupled is either an Ethernet or Token Ring configuration, and permits communications according to corresponding protocols. However, it will be appreciated that the scope of the present invention is intended to include any suitable system backbone. The cradle 90 further includes a power supply apparatus 124, the apparatus 124 includes a power converter 126 for providing power to the cradle 90 via a cord 128. The apparatus 124 receives power via a conventional power cord 130 which plugs into a standard 110 VAC outlet, for example. The AC power which is provided to the cradle 90 via the power cord 130 is input to the converter 126 which converts the AC power received via the power cord 130 to a suitable DC voltage which is provided to power and ground lines (not shown). As a result, when the mobile terminal 10 is docked in the cradle 90, the mobile terminal 10 will receive external power from cradle 90 via contacts 60, 62, 110 and 112 for operation and/or charging of the batteries.

Figure 3:
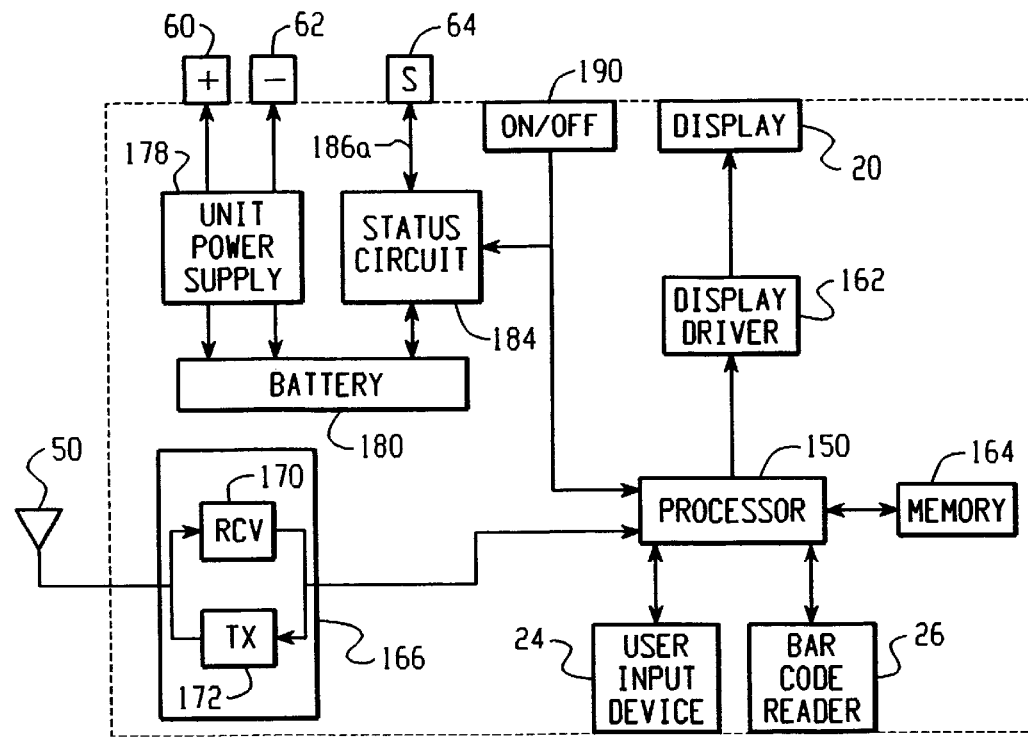
FIG. 3 is a block diagram representing the basic structure of a mobile terminal in accordance with the present invention.

FIG. 3 is a block diagram representing the basic structure of the mobile terminal 10 in accordance with an exemplary embodiment of the present invention. The mobile terminal 10 includes a processor 150 which can be programmed to control and to operate the various components within the mobile terminal 10 in order to carry out the various functions described herein. The processor 150 is coupled to a user input device 24 which allows an operator to input data to be communicated to a Local Area Network (LAN) such as inventory data, patient information, etc. This information may be sent to a host computer (not shown) which serves as a central data location, for example, or to a cash register connected to a system backbone, etc. The input device 24 can include such items as a keypad, touch sensitive display, etc. The mobile terminal 10 also may include a bar code reader 26 coupled to the processor 150 for providing another form of data input. The bar code reader 26 and the aforementioned input device 24 may be coupled to the processor via a user input interface circuitry (not shown). The user input interface circuitry could perform any conventional conditioning of the output signals from the bar code reader 26 and input device 24 as may be appropriate so that they may be received by the processor 150.

The display 20 is also connected to and controlled by the processor 150 via a display driver circuit 162. The display 20 serves as a means for displaying information stored within the mobile terminal 10 and/or received over a system backbone, for example. The display 20 can be a flat panel liquid crystal display with alphanumeric capabilities, for example, or any type of display suitable for the present invention as will be appreciated.

A memory 164 is included in the mobile terminal 10 for storing information such as program code executed by the processor 150 for carrying out the functions described herein. The actual code for performing such functions could be easily programmed by a person having ordinary skill in the art for computer programming in any of a number of conventional programming languages based on the disclosure herein. Consequently, further detail as to the particular code has been omitted for sake of brevity. The memory 164 also serves as a storage medium for storing information input by the user and/or received from or transmitted by a transceiver such as RF section 166. The memory 164 may include both volatile and non-volatile memory, and may include a hard drive or other high density storage medium.

The RF section 166 is also connected to the processor 150. The RF section 166 includes an RF receiver 170 which receives RF transmissions from a base station (not shown), for example, via the antenna 50 and demodulates the signal to obtain digital information modulated therein.

The RF section 166 also includes an RF transmitter 172. In the event the mobile terminal 10 is to transmit information in response to an operator input at the input device 24, for example, the processor 150 forms within the memory 164 an information packet (not shown) including data together with a source address (i.e.,the address of the particular mobile terminal 10 sending the information) and a destination address (e.g., a host computer (not shown)). The information packet is then delivered to the RF transmitter 172 which transmits an RF signal with the information packet modulated thereon via the antenna 50 to the destination device. An example of a suitable RF section 166 for use in the mobile terminal 10 is the Model 025 Direct Sequence Spread Spectrum Radio Module, which is commercially available from Aironet Wireless Communications, Inc. of Akron, Ohio.

The mobile terminal 10 further includes a unit power supply 178 which provides power to the mobile terminal 10. The unit power supply 178 is coupled to the contacts 60 and 62 and also to a detachable battery pack 180. Thus, when the mobile terminal 10 is in a mobile state, the unit power supply provides power to the mobile terminal 10 via the battery pack 180. When the mobile terminal 10 is docked, the unit power supply 178 can receive power externally via contacts 60 and 62 in order to operate the mobile terminal 10 as well as charge the batteries in the battery pack 180. The battery pack 180 in this embodiment includes batteries which can be interchanged between a Ni—Cd and Li—Ion battery. However, it is to be appreciated that the scope of the present invention is intended to include any suitable battery types for use in the mobile terminal 10 according to the present invention. The circuitry of the present invention is illustrated handling differentiating between two battery types (i.e., Ni—Cd and Li—Ion) for ease of understanding, but the scope of the present invention intends to include differentiating between a plurality of battery types. The batteries of the battery pack 180 are connected via the unit power supply 178 to positive and negative contacts 60 and 62, respectively. The battery pack 180 is also tied to a battery charging status circuit 184 which feeds a status line 186a which provides the cradle 90 via contacts 64 and 114 with an appropriate voltage level representative of the type of battery being used by the mobile terminal 10. The status circuit 184 is shown in greater detail in FIG. 5.

Figure 4:
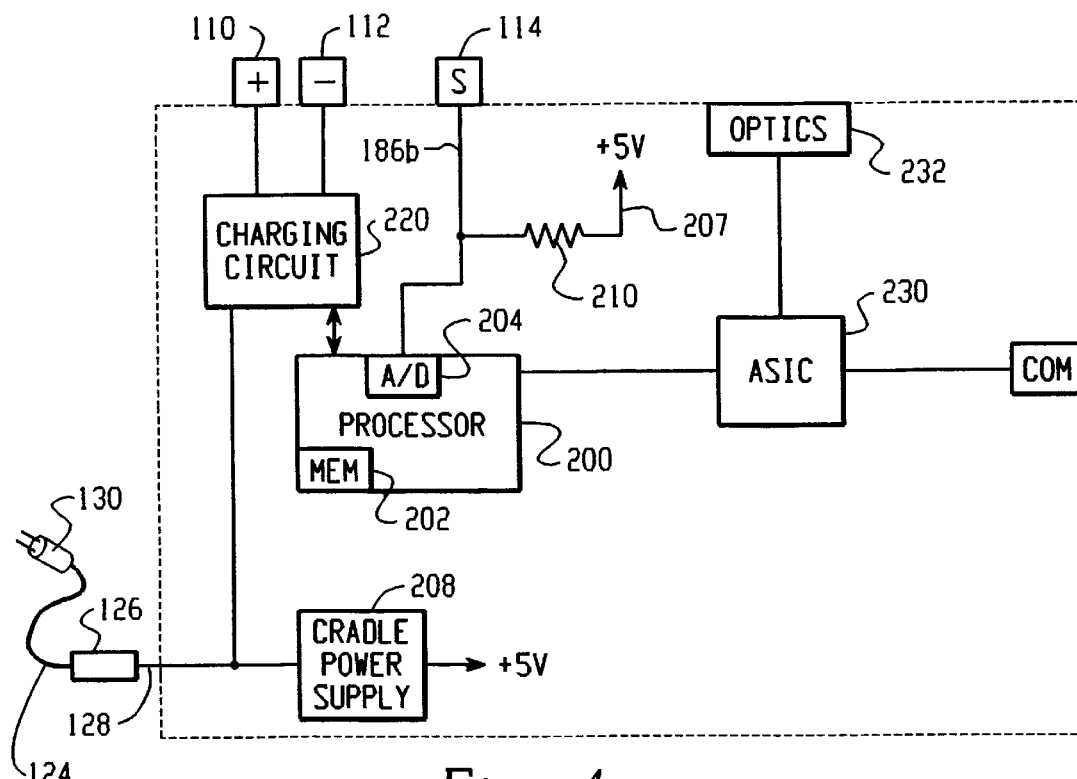
FIG. 4 is a block diagram representing the basic structure of a cradle in accordance with the present invention.

Referring now to FIG. 4, a block diagram of the cradle 90 is shown. The cradle 90 includes a processor 200 with a built in memory 202. Furthermore, the processor 200 includes an Analog to Digital (A/D) converter 204. The status line 186a from the mobile terminal 10 is connected to the cradle 90 via contacts 64 and 114 to sense line 186b which ties into the A/D converter 204. The sense line 186b leading to the A/D converter 204 is tied high (e.g., ±5V) by a pull up resistor 210 tied to line 207. The line 207 receives its ±5V from a cradle power supply 208. As is discussed in greater detail below, when the mobile terminal 10 is docked to the cradle 90, the sense line 186b leading to the A/D converter 204 will be pulled down in voltage (e.g., the voltage will drop below ±4.7V) indicating to the cradle 90 that the mobile terminal 10 has docked. A charging circuit 220 provides power (including battery recharging power) to the mobile terminal 10. The processor 200 controls the charging circuit 220 in the cradle 90 based on the level of voltage received from the sense line 186b to the A/D 204. Thus, the processor 200 is able to discriminate among different battery types being used in the mobile terminal 10 with the aid of the signal on the sense line 186b. The processor 200 determines the status of the mobile terminal 10 as well as the type of battery being used from the voltage applied to the A/D 204. Accordingly, the processor 200 controls the charging circuit 220 so that an appropriate amount of power (i.e., suitable for the charge characteristics of the battery type being used) is delivered to the mobile terminal 10. Of course, digital circuit components of other processors could be used to receive the signal on the sense line 186b and control the charge current supplied to the mobile terminal 10 through contacts 110 and 111.

The cradle power supply 208 provides all circuits in the cradle 90 with ±5V. The cradle power supply 208 is fed via the power supply apparatus 124. The power supply apparatus 124 is also tied to the charging circuit 220 so that operational power as well as charging power can be provided to the mobile terminal 10. An Application Specific Integrated Circuit (ASIC) 230 is also in the cradle 90 to control COM port and optical communication. The mobile terminal 10 can download information optically via optics 232 which can be converted and sent via a COM port to a host computer (not shown). Therefore, the purpose of the optics 232 is for transmitting and receiving information from the mobile terminal 10.

Figure 5:
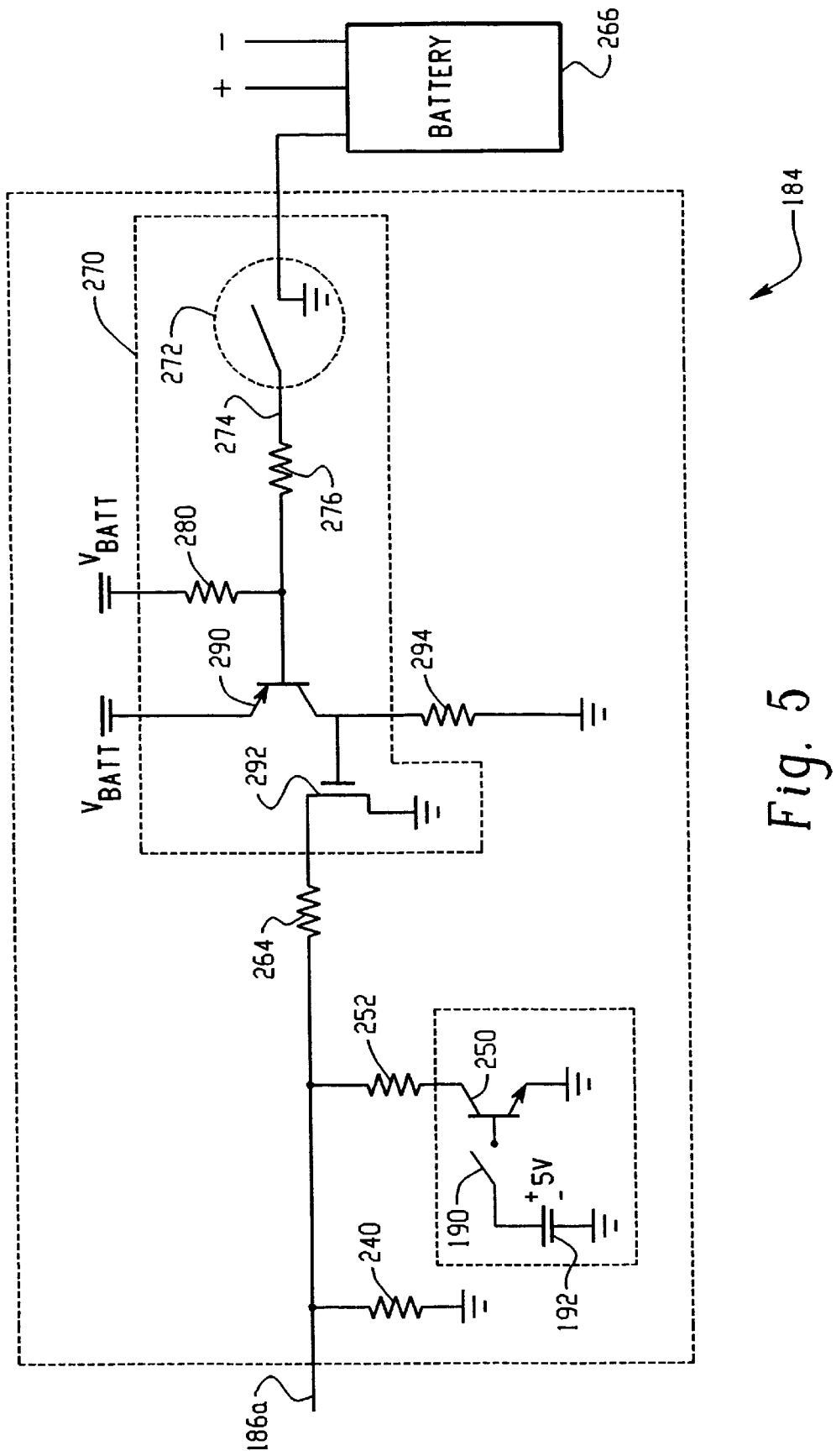
FIG. 5 is a schematic diagram of a status circuit according to the present invention.

The status circuit 184 is depicted in greater detail in FIG. 5. The status circuit 184 is employed to vary the voltage that is ultimately applied to the A/D 204 of the cradle 90. As will be discussed in greater detail below, the processor 200 can determine whether or not the mobile terminal 10 is docked to the cradle 90, whether the mobile terminal 10 is on or off while docked in the cradle 90, and what type of batteries the mobile terminal 10 is using. The status circuit 184 accomplishes the varying of the voltage applied to the A/D 204 via a plurality of pull down resistors which are engaged or not engaged alone and/or in combination to effect voltage dividers which pull down the voltage applied to A/D 204 based on the status of the mobile terminal and the type of batteries being used.

A first pull down resistor 240 (preferably of 1 Meg resistance) is connected to the status line 186a so that when the mobile terminal 10 is placed in the cradle 90, the voltage on the sense line 186b in the cradle 90 is pulled down to indicate to the processor 200 of the cradle 90 that a mobile terminal 10 is docked. When the mobile terminal 10 is not docked to the cradle 90, the voltage on sense line 186b is not pulled down and therefore the voltage applied to the A/D 204 via line 206 is 5 volts.

The status circuit 184 includes an On/Off switch portion 190. The On/Off switch portion 190 is tied to a voltage source 192 (e.g., 5 volts) The other end of the On/Off switch portion is coupled to the base of a transistor 250. When the mobile terminal 10 is "ON", the on/off switch 190 is closed, thus causing the transistor 250 to conduct. An emitter of the transistor 250 is tied to ground, and the collector of the transistor 250 is tied to a second pull down resistor 252. The other end of the second pull down resistor 252 is tied to the status line 186a. When the transistor 250 conducts, the second pull down resistor 252 is tied to ground via the conducting transistor 250. Thus, the voltage level on the status line 186a is further reduced as a result of the addition of the second pull down resistor 252 to the voltage divider.

The voltage varying line 260 is connected via a resistor 264 to a battery type circuit 270 shown by dotted line which is also included in the status circuit 184. One or more rechargeable batteries 266 inside of battery pack 180 are coupled to the battery type circuit 270 via a switch 272. As will be discussed in greater detail below, the switch 272 opens and closes depending on the type of battery pack 180 being used by the mobile terminal 10. For example, when a Li—Ion type battery pack 180a (see FIG. 6A) is inserted in the mobile terminal 10, the switch 272 remains open. On the other hand, when a Ni—Cd type battery pack 180b (see FIG. 6B) is inserted in the mobile terminal 10, the switch 272 closes. The other end of the switch 272 is tied to a line 274 and resistor 276. By maintaining the switch 272 open, the battery type signal on line 274 stays in a float state. The line 274 and a voltage source $V_{BATT}$ via a resistor 280 are tied to the base of a transistor 290. The collector of the transistor 290 is also tied to $V_{BATT}$ and the emitter is tied to the base of a Field Effect Transistor (FET) 292 and a third pull down resistor 294 which is tied to ground. When the battery type signal on line 274 is in a float state (i.e., the switch 272 is open), the transistor 290 does not conduct. When the transistor 290 does not conduct, the FET 292 also does not conduct. When the FET 292 is not conducting, the third pull down resistor 294 is not introduced to the status line 186a.

When the switch 272 is closed, the battery type signal on line 274 is grounded causing the transistor 290 to conduct and in turn causing the FET 292 to conduct. Current then flows from $V_{BATT}$ down through the third pull down resistor 294 thereby activating the FET 292 and causing the voltage on status line 186a to drop. The drop in voltage on status line 186a is sensed by the processor 200 of the cradle 90 via sense line 186b and contacts 64 and 114. The processor 200 differentiates the battery type based on the sensed voltage level and thus charges the battery 266 in the mobile terminal 10 in accordance with the battery's particular charge characteristics.

The various circuit component values and types (i.e., resistance values, capacitance values, transistor types, etc.) and the construction of the other circuit elements illustrated will depend on the particular application of the present invention. These details are within the abilities of those skilled in the art and therefore are not more particularly described herein. It should also be appreciated that many of the components included in the mobile terminal 10 and the cradle 90 can be integrated onto one or more integrated circuits.

FIGS. 6A and 6B shows one exemplary embodiment of how different battery packs inserted in the mobile terminal 10 can cause the switch 272 to open or close. The battery pack 180a is for batteries of the Li—Ion type. The battery pack 180a includes a housing 302. The housing 302 is designed to provide for easy installation and removal of the battery pack 180a into and from the mobile terminal 10. The battery pack 180a houses the batteries therein and provides for secure, watertight housing of the batteries. The battery pack 180a includes a recess 306. The recess 306 is provided to ensure that the battery pack 180a does not engage the switch 272 when the battery pack 180a is placed in the mobile terminal 10. Thus, when the Li—Ion battery pack is inserted in the mobile terminal 10, the switch 272 remains open thereby causing the voltage on status line 186a to remain in a state which indicates to the processor 200 that a Li—Ion battery is being used by the mobile terminal 10.

FIG. 6B shows a Ni—Cd battery pack 180b which also includes a housing 308. The Ni—Cd battery pack 180b is essentially the same as that of the Li—Ion battery pack 180a and therefore further detail is omitted for sake of brevity. However, a difference does exist in that the Ni—Cd battery pack 180b does not have a recess like the recess 306 of the Li—Ion battery pack 180a. As a result, when the Ni—Cd battery pack 180b is inserted in the mobile terminal 10, the battery pack 180b comes into contact with switch 272 to close it. Thus, when the Ni—Cd battery pack 180b is inserted in the mobile terminal 10, the switch 272 closes thereby causing the voltage on status line 186a to drop in the manner described above, which indicates to the processor 200 that a Ni—Cd battery is being used by the mobile terminal 10.

It should be appreciated that there are numerous ways to effect such closing and opening of the switch 272 whether it be mechanical or electrical, all of which are intended to fall within the scope of the present invention.

FIG. 7 shows a table 310 which is stored in the memory 202 of the processor 200 of the cradle 90. The table 310 is used by the processor 200 to determine whether or not the mobile terminal 10 is docked to the cradle 90, whether the mobile terminal 10 is on or off while docked in the cradle 90, and what type of batteries the mobile terminal 10 is using. Such determination is made via the voltage levels applied to the A/D 204 via the status circuit 184.

When the mobile terminal 10 is not docked to the cradle 90, as mentioned above, the voltage applied to the A/D 204 is 5 volts. The processor 200 thus determines from table 310 that the voltage level of 5 volts applied to the A/D 204 indicates that the mobile terminal 10 is not docked to the cradle 90. When the mobile terminal 10 is docked to the cradle 90, the first pull down resistor 240 pulls down the voltage applied to the A/D 204 below 5 volts thus indicating to the processor 200 that the mobile terminal 10 is docked to the cradle. If the mobile terminal 10 is on while docked in the cradle 90, the switch 190 is closed thereby engaging the first pull down resistor 252 further causing a drop in voltage applied to the A/D 204. Depending on the type of battery pack being used by the mobile terminal 10, the third pull down resistor 294 is engaged or disengaged as discussed above.

Thus, based on the different voltage levels applied to the A/D 204, the processor 100 can determine whether the mobile terminal 10 is docked to the cradle 90 or not, whether the mobile terminal 10 while docked to the cradle 90 is on or off, and what type of batteries the mobile terminal 10 is using. Referring more specifically to table 310, if the voltage level applied to the A/D is 5 volts, the processor 200 determines that no mobile terminal 10 is docked to the cradle 90. If the voltage level applied to the A/D 204 is in the range of 4.3–4.7 volts, the processor 200 determines that the mobile terminal 10 is docked to the cradle 90, is turned off, and is using Li—Ion batteries. If the voltage applied to the A/D is in the range of 2.9–3.3 volts, the processor 200 determines that the mobile terminal 10 is docked to the cradle 90, is turned on, and is using Li—Ion batteries. If the voltage applied to the A/D is in the range of 2.25–2.6 volts, the processor 200 determines that the mobile terminal 10 is docked to the cradle 90, is turned off, and is using Ni—Cd batteries. If the voltage applied to the A/D is in the range of 1.82–2.1 volts, the processor 200 determines that the mobile terminal 10 is docked to the cradle 90, is turned on, and is using Ni—Cd batteries.

Once the processor 200 determines the status of the mobile terminal 10 (i.e., docked, not docked, on or off) and the type of battery being used, the processor 200 can apply an appropriate amount of power to the mobile terminal via the charging circuit 220, contacts 110, 112 and corresponding contacts 60 and 62 of the mobile terminal 10. The amount of recharging current to be applied to the battery pack 180a or 180b from the cradle charging circuitry 220 is well known in the art for the various charging characteristics of the battery types, and will vary depending on the particular application. Therefore, further detail as to such is not presented.

Figure 8:
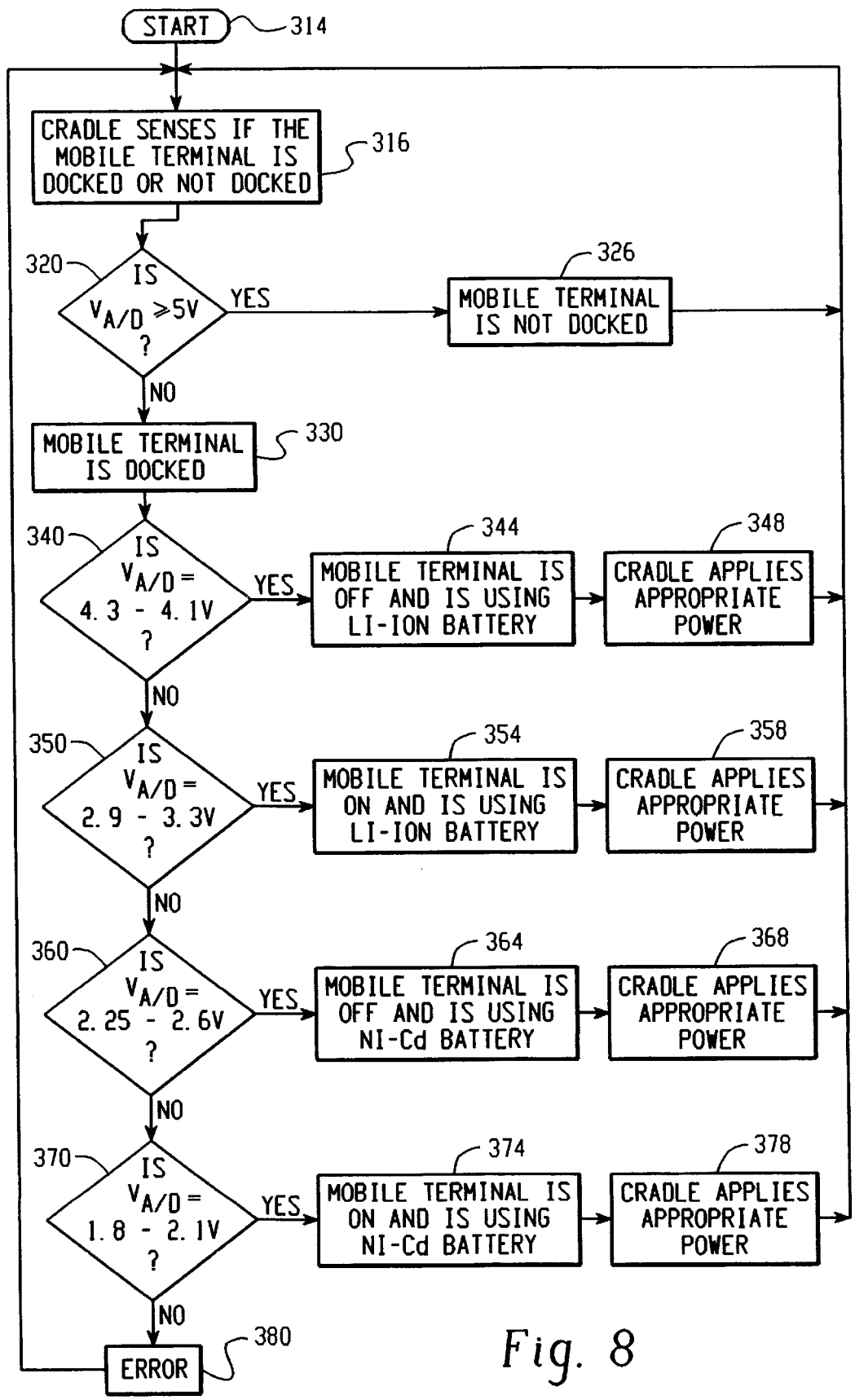
FIG. 8 is a flow chart representing the operation of the cradle and mobile terminal in accordance with the present invention.

Turning now to FIG. 8, a flow chart is provided which represents the general methodology of the present invention. In overview, the cradle 90 determines the status of the mobile terminal 10 and the type of batteries the mobile terminal 10 is using based on the voltage level applied to the A/D 204. More specifically, in step 314 the cradle 90 is powered up to begin carrying out the functions described above. For sake of brevity, a discussion as to the powering up of either the cradle 90 and mobile terminal 10 is not provided. In step 316, the cradle 90 is in an active state awaiting the mobile terminal 10 to dock to it. In step 320, the processor 200 of the cradle determines if the voltage applied to the A/D 204 (VA/D) is greater than or equal to 5 volts. If yes, the processor 200 proceeds to step 326 where it determines that the mobile terminal 10 is not docked to the cradle 90. The processor 200 then returns to step 316. If in step 320, $V_{A/D}$ is not greater than or equal to 5 volts, the processor proceeds to step 330. In step 330, the processor 200 determines via table 310 that the mobile terminal 10 is docked to the cradle 90 based on $V_{A/D}$ being lower than 5 volts. As is mentioned above, the drop in voltage is the result of the first pull down resistor 240 engaging with the sense line 186b as a result of the mobile terminal 10 docking to the cradle 90. The engagement of the first pull down resistor 240 results in a voltage divider that pulls down $V_{A/D}$ below 5 volts.

After step 330, the processor proceeds to step 340 where it determines if $V_{A/D}$ is within the range of 4.3–4.7 volts. If yes, the processor 200 proceeds to step 344 where it determines via table 310 that the mobile terminal is off and is using a Li—Ion type battery. The Li—Ion battery pack 180a includes the recess 306 which maintains switch 272 open. Furthermore, since the mobile terminal 10 is off, switch 190 remains open. As a result, only the first pull down resistor 240 is engaged, which results in $V_{A/D}$ falling within the range of 4.3–4.7 volts. In step 348, the processor 200 applies an appropriate level of power via the charging circuit 220 and contacts 110, 112 and corresponding contacts 60 and 62 of the mobile terminal 10. The processor 200 then returns to step 316.

If in step 340, $V_{A/D}$ is not within the range of 4.3–4.7 volts, the processor 200 proceeds to step 350. In step 350, the processor 200 determines if $V_{A/D}$ is within the range of 2.9–3.3 volts. If yes, the processor 200 proceeds to step 354 where it determines from table 310 that the mobile terminal 10 is on and is using a Li—Ion type battery. As mentioned above, the Li—Ion battery pack 180a includes the recess 306 which maintains switch 272 open. However, since the mobile terminal 10 is on, switch 190 is now closed. As a result, the first pull down resistor 240 and the second pull down resistor 252 are engaged, which results in $V_{A/D}$ falling within the range of 2.9–3.3 volts. In step 358, the processor 200 applies an appropriate level of power via the charging circuit 220 and contacts 110, 112 and corresponding contacts 60 and 62 of the mobile terminal 10. The processor 200 then returns to step 316.

If in step 350, the processor 200 determines if $V_{A/D}$ is not within the range of 4.3–4.7 volts it proceeds to step 360. In step 360, the processor 200 determines if $V_{A/D}$ is within the range of 2.25–2.6 volts. If yes, the processor 200 proceeds to step 364 where it determines via table 310 that the mobile terminal is off and is using a Ni—Cd type battery. The Ni—Cd battery pack 180b does not include the recess 306 and thus closes switch 272. The closing of switch 272 results in the engagement of the third pull down resistor 294. Since the mobile terminal 10 is off, switch 190 remains open. As a result, only the first and third pull down resistors 240 and 294 are engaged, which results in $V_{A/D}$ falling within the range of 2.25–2.6 volts. In step 368, the processor 200 applies an appropriate level of power via the charging circuit 220 and contacts 110, 112 and corresponding contacts 60 and 62 of the mobile terminal 10. The processor 200 then returns to step 316.

If in step 360, $V_{A/D}$ is not within the range of 2.25–2.6 volts, the processor 200 proceeds to step 370. In step 370, the processor 200 determines if $V_{A/D}$ is within the range of 1.8–2.1 volts. If yes, the processor 200 proceeds to step 374 where it determines from table 310 that the mobile terminal 10 is on and is using a Ni—Cd type battery. As mentioned above, the Ni—Cd battery pack 180b does not includes the recess 306 and thus switch 272 is closed. Furthermore, since the mobile terminal 10 is on, switch 190 is now closed. As a result, the first, second and third pull down resistors 240, 252 and 294, respectively, are engaged, which results in $V_{A/D}$ falling within the range of 1.8–2.1 volts. In step 378, the processor 200 applies an appropriate level of power via the charging circuit 220 and contacts 110, 112 and corresponding contacts 60 and 62 of the mobile terminal 10. The processor 200 then returns to step 316.

If in step 370, the processor 200 determines that $V_{A/D}$ is not within the range of 1.8–2.1 volts, the processor 200 proceeds to step 380. In step 380, the processor 200 generates an error message which is forwarded to processor 150 in the mobile terminal 10. The processor 150 then generates an error message which is provided to the user via the display 20. After step 380, the processor 200 proceeds back to step 316.

Although, the present invention has been described with respect to the battery packs 180a or 180b closing or opening a switch 272 which in turn alters the voltage applied to the A/D 204, it will be appreciated that other techniques can be employed to accomplish such sensing by the cradle 90. For instance, it will be appreciated that the user himself could input the status of the mobile terminal 10 including battery type via the user input device so that the cradle 90 can determine what level of power to apply to the mobile terminal 10.

Furthermore, it should be understood that other means for closing the switch 272 can be employed besides the use or lack of use of a recess 306 in the battery pack. For example, the battery pack could have a bar code label attached thereto which could be scanned by an internal bar code reader (not shown). The bar code label could indicate the type of batteries associated with the battery pack. The bar code reader could send this information directly to the processor 200 which in turn would provide an appropriate level of power to the mobile terminal 10. Alternatively, internal circuitry to the battery pack 180 could be configured to place the status circuit 184 into the appropriate state depending on the battery type involved. In yet another embodiment, a program could be loaded that allows a user to input the battery type from a keypad or other user input device 24.

It will be appreciated that the scope of the present invention is intended to include any mobile terminal 10 that indicates to the cradle 90 either actively or passively whether its docked or not docked to the cradle 90, whether its on or off, and the type of battery its employing. The cradle 90 sensing the status of the mobile terminal 10 and the battery type applies an appropriate level of power to the mobile terminal 10 so that the mobile terminal 10 may operate while docked to the cradle 90 and/or so as to recharge the batteries currently being used by the mobile terminal.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A battery charging system, comprising:
   a mobile terminal, the mobile terminal including a battery pack housing for storing at least one of a plurality of batteries;
   the plurality of batteries including batteries of a first battery type and batteries of a second battery type, the batteries of the first battery type having charge characteristics different from the batteries of the second battery type; and
   a docking cradle for receiving and storing the mobile terminal, the cradle including a battery charger for charging the at least one of a plurality of batteries, the battery charger including a battery discriminator for identifying whether the at least one of a plurality of batteries is of the first battery type or of the second battery type, the battery type identifying being a function of a mechanical feature of the mobile terminal, wherein the battery charger charges the one of a plurality of batteries in accordance with the identification of the battery type determined by the battery discriminator.

2. The battery charging system of claim 1, wherein the mechanical feature includes a recess in the battery pack housing.

3. The battery charging system of claim 1, wherein the mobile terminal includes a status contact for coupling with the battery discriminator when the mobile terminal is received in the cradle, the mobile terminal further including battery charging status circuitry, the status circuitry providing a first signal level on the status contact when the one of a plurality of batteries is of the first battery type and a second signal level on the status contact when one of a plurality of batteries is of the second battery type.

4. The battery charging system of claim 3, wherein the status circuitry further varies the signal level on the status contact based on whether the mobile terminal is in an on state or an off state.

5. The battery charging system of claim 3, wherein the battery discriminator includes sensing circuitry for sensing the signal level output from the status circuitry indicative of the battery type of the at least one a plurality of batteries.

6. The battery charging system of claim 3, wherein the status circuitry varies the signal level in response to the type of the battery pack housing, the battery pack housing being of a first type for the first battery type and being of a second type for the second battery type.

7. The battery charging system of claim 1, wherein the first battery type is a Nickel-Cadmium battery.

8. The battery charging system of claim 1, wherein the first battery type is a Lithium-Ion battery.

9. The battery charging system of claim 1, wherein the first battery type is a Nickel Metal Hydride battery.

10. The battery charging system of claim 4, wherein the varied signal level is a varied voltage level.

11. The battery charging system of claim 4, wherein the battery discriminator employs a lookup table in determining the status of the mobile terminal and battery type identifications, the lookup table including a list of signal levels which correspond to the status of the mobile terminal and the battery type.

12. A docking cradle for a mobile terminal, comprising:
   a housing, the housing being adapted to receive and store the mobile terminal;
   a battery charger for charging at least one battery of the mobile terminal; and
   a battery discriminator for discriminating whether the at least one battery is of a first battery type or of a second battery type, the first battery type having charge characteristics different from the second battery type;
   wherein the battery charger charges the at least one battery in accordance with the battery type of the at least one battery determined by the battery discriminator, wherein the battery type discrimination is a function of a mechanical feature of the mobile terminal.

13. The docking cradle of claim 12, wherein the mechanical feature includes a recess a battery pack housing of the mobile terminal.

14. The docking cradle of claim 12, wherein the battery discriminator includes sensing circuitry for sensing a signal level output from the mobile terminal indicative of the battery type of the at least one battery.

15. The docking cradle of claim 12, wherein the signal level is a voltage level, and wherein the voltage level sensed by the sensing circuitry is converted to a digital signal which is processed by the cradle in order to determine the battery type sensed.

16. The docking cradle of claim 12, wherein the docking cradle supplies power to the mobile terminal so that the mobile terminal may operate while docked to the docking cradle.

17. The docking cradle of claim 12, wherein the docking cradle serves as an interface for the mobile terminal and a network.

18. A method for charging a mobile terminal, comprising the steps of:
   coupling the mobile terminal to a battery charger, the battery charger being adapted to charge at least one battery of the mobile terminal, the at least one battery being any one of a plurality of battery types having different charge characteristics, the at least one battery being housed in a battery pack, the battery pack being any one of a plurality of types of battery packs corresponding to the plurality of battery types;
   using the battery charger to discriminate the type of the at least one battery from the plurality of battery types based on the type of battery pack, wherein the battery charger discriminates the type of the at least one battery based on a signal received from the mobile terminal corresponding to a mechanical feature of the battery pack, the signal being representative of the type of the at least one battery; and
   charging the at least one battery according to the thus determined type of the at least one battery.

19. The method of claim 18, wherein the step of using the battery charger to discriminate the type of the at least one battery from the plurality of battery types further includes the step of:
   using a lookup table to determining the status of the mobile terminal and the battery type, the lookup table including a list of signal levels which correspond to the status of the mobile terminal and the battery type.

20. The method of claim 18, wherein the mechanical feature includes a recess in a housing of the battery pack.

21. A method of determining a charge current to supply a mobile terminal, comprising the steps of:

receiving the mobile terminal by a cradle, the mobile terminal including a rechargeable battery housed in a battery pack, the battery pack being one of at least two types;

providing a signal on a status contact associated with the mobile terminal indicative of a type of rechargeable battery included in the mobile terminal, the signal corresponding to a mechanical feature representative of the battery pack type;

sensing the signal on the status contact of the mobile terminal with a battery discriminator of the cradle; and providing from the cradle an appropriate charge current to the rechargeable battery based on the signal sensed on the status contact.

22. The method of claim 21, wherein the signal is generated by battery charging status circuitry of the mobile terminal.

23. The method of claim 21, wherein the mechanical feature includes a recess in a housing of the battery pack.

24. A mobile terminal, comprising:

a housing shaped to be received by a cradle;

a rechargeable battery; and battery charging status circuitry disposed in the housing and interfacing with the rechargeable battery; the status circuitry providing an output signal to be sensed by circuitry associated with the docking cradle when the mobile terminal is received in the docking cradle, the output signal being of a first signal level if the rechargeable battery is of a first battery type and a second signal level if the rechargeable battery is of a second battery type, wherein the output signal is a function of a mechanical feature of a type of battery pack housing the rechargeable battery, the battery pack being of a first type for the first battery type and being of a second type for the second battery type.

25. The mobile terminal of claim 24, wherein the mechanical feature includes a recess in a housing of the battery pack.

26. The mobile terminal of claim 21, wherein the output signal is of a third signal level if the mobile terminal is on and a fourth signal level if the mobile terminal is off.

27. The mobile terminal of claim 26, wherein the output signal is varied with respect to voltage level.

* * * * *